United States Patent Office 2,721,852
Patented Oct. 25, 1955

2,721,852

INTERPOLYMERS OF VINYLPYRIDINES OR VINYLQUINOLINES, ACRYLIC ESTERS, ACRYLIC AMIDES AND STYRENES, AND HYDROSOLS THEREOF

William F. Fowler, Jr., and Delbert D. Reynolds, Rochester, N. Y., assignors to Eastman Kodak Company, Rochester, N. Y., a corporation of New Jersey No Drawing. Application February 5, 1954, Serial No. 408,572

18 Claims. (Cl. 260—29.6)

This invention relates to quaternary interpolymers containing vinylpyridine or vinylquinoline which have the ability to mordant acid dyes, to hydrosols thereof which are compatible with certain hydrophilic colloids to give improved compositions where such colloids are employed.

In the preparation of various photographic materials the usual practice has been to employ a naturally occurring hydrophilic colloid such as gelatin. One of the principal objections to the use of gelatin and other like colloids is their tendency to brittleness when coated from aqueous solution in the form of a layer of substantial thickness. Various attempts to improve the flexibility of gelatin and like colloids by adding thereto suspensions of elastic material, prior to coating, have usually been found to be unsatisfactory because of the optical and mechanical incompatibility of the gelatin with the additive resulting in too much haziness of the final film or coagulation of the suspension before the gelatin layer has dried. For instance, addition of synthetic water-soluble polymers to gelatin or the like has been generally unsatisfactory as usually these polymers are either incompatible with the gelatin at some point or exhibit brittleness. Also, gelatin and like colloids are incapable of mordanting or fixing acid dyes. Consequently, in certain processes where such dyes are employed, especially in photographic processes, it is necessary to employ a mordanting agent in one or more layers or coatings to prevent diffusion of the dyes.

We have now found that superior mordants for acid dyes, which are at the same time highly compatible with aqueous gelatin solutions and impart thereto improved flexibility without loss of any of the good properties of gelatin are obtained by interpolymerizing minor proportions of certain vinylpyridines or vinylquinolines with major proportions of mixtures of an alkyl acrylate or alpha substituted acrylates such as methacrylate, an acrylic or alpha substituted acrylamide such as methacrylamide and a styrene. The interpolymers of our invention are especially good mordants for photographic purposes. They can be employed advantageously to prevent diffusion of dyes and dye couplers, etc., containing carboxyl, sulfonic acid or sulfonic acid ester groups, and the like, when incorporated in light filter layers, in backing layers designed to prevent back reflection from the film support, in overcoating layers to protect the film, in imbibition printing blanks. They are also useful as carriers for the silver halide. With other polymers such as gelatin, casein, and cellulose derivatives, they act as peptizers and permit grain growth. In general, the interpolymers of our invention are of value for both color and black and white photographic applications.

It is, accordingly, an object of the invention to provide a new class of synthetic resins containing vinylpyridine or vinylquinoline type compounds. Another object is to provide synthetic resins which mordant acid dyes. A further object is to provide hydrosols of our new class of resins which are compatible with aqueous gelatin solutions, which solutions can be coated out and dried to give layers of improved flexibility and dye mordanting without loss of optical properties, as compared with gelatin alone. A still further object is to provide a process for preparing our new class of resinous interpolymers and hydrosols thereof. Other objects will become apparent hereinafter.

In accordance with the invention we prepare our new vinylpyridine or vinylquinoline polymers by heating in the presence of a polymerization catalyst a mixture comprising as the sole polymerizable components from 3.5 to 16 parts by weight of the vinylpyridine or vinylquinoline compound, from 50 to 60 parts by weight of the alkyl acrylate compound, from 3.5 to 16 parts by weight of the acrylic amide compound and from 12 to 26 parts by weight of the styrene compound. If desired, the vinylpyridine or vinylquinoline compound can be used in the form of their water-soluble salts, e. g., the hydrochloride salt, in which case the above specified proportions would be equivalent to approximately from 4.7 to 21.5 parts by weight of the hydrochloride salt. The final polymeric products obtained contain the polymerizable components in about the same proportions as present in the initial polymerization mixtures.

Suitable vinylpyridine and vinylquinoline compounds for practicing our invention are the C-vinyl group substituted pyridines and quinolines represented by the following general formulas:

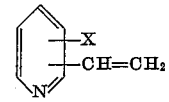

and

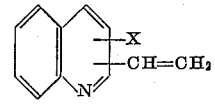

wherein X represents an atom of hydrogen, an alkyl group containing from 1 to 4 carbon atoms or a halogen group such as chlorine or bromine. Typical compounds of this group are 2-vinylpyridine, 3-vinylpyridine, 4-vinylpyridine, 3-methyl-5-pyridine, 2-vinylquinoline, 3-vinylquinoline, 3-methyl-2-vinylpyridine, 5-bromo-2-vinylpyridine, etc. Preferably these bases are used in the form of their water-soluble salts, e. g., the hydrochloride salts. Suitable alkyl acrylates and methacrylates may be represented by the following general formula:

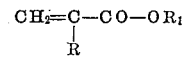

wherein R represents hydrogen, a halogen atom or an alkyl group containing from 1 to 4 carbon atoms and $R_1$ represents an alkyl group containing from 1 to 12 carbon atoms, a cyanoalkyl group containing from 1 to 4 carbon atoms and a halogen substituted alkyl group containing from 1 to 4 carbon atoms such as methyl acrylate, ethyl acrylate, isopropyl acrylate, propyl acrylate, isobutyl acrylate, n-butyl acrylate, n-octyl acrylate, 2-ethylhexyl acrylate, β-cyanoethyl acrylate, β-chloroethyl acrylate, methyl methacrylate, ethyl methacrylate, isobutyl methacrylate, n-butyl methacrylate, β-cyanoethyl methacrylate, etc. Suitable acrylic and methacrylic amides may be represented by the following general formula:

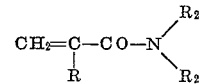

wherein R has the above definition and $R_2$ represents hydrogen or an alkyl group containing from 1 to 4 carbon atoms, such as acrylamide, N-methyl acrylamide, N-ethyl acrylamide, N-isopropyl acrylamide, N-n-butyl acrylamide, N,N-dimethylacrylamide, methacrylamide, N-methyl methacrylamide, N-n-butyl methacrylamide, etc. Suitable styrene compounds may be represented by the following general formula:

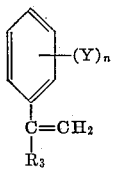

wherein $n$ represents a whole number from 1 to 5, Y represents an atom of hydrogen, an alkyl group containing from 1 to 4 carbon atoms, a cyano group, a nitro group, a halogen atom or a dialkylamino group containing from 1 to 4 carbon atoms and $R_3$ represents an atom of hydrogen or an alkyl group containing from 1 to 4 carbon atoms. Typical styrene compounds coming within the above general formula include styrene, o-methyl styrene, m-methyl styrene, p-methyl styrene, α-methyl styrene, 2,4-dimethyl styrene, 2,4,5-trimethyl styrene, o-ethyl styrene, 3,5-diethyl styrene, p-n-butyl styrene, m-tert. butyl styrene, o-cyano styrene, m-cyano styrene, p-cyano styrene, o-nitro styrene, p-dimethylamino styrene, o-chloro styrene, p-chloro styrene, 2,3-dichloro styrene, 2,3,4,5,6-pentachloro styrene, o-bromo styrene, o-fluoro styrene, p-fluoro styrene, and the like.

The polymerizations for preparing the above defined new class of resinous interpolymers of the invention can be carried out in aqueous dispersion, in the presence of a polymerization catalyst. Heat and actinic light also accelerate the polymerizations. Compounds which are suitable for catalysts include per-compounds such as organic and inorganic peroxides, for example, benzoyl peroxide, acetyl peroxide, lauroyl peroxide, hydrogen peroxide, or persulfates, e. g., alkali metal persulfates such as sodium and potassium persulfates, ammonium persulfate, etc., perborates, e. g., alkali metal perborates such as sodium and potassium perborates, ammonium perborate, etc. Azo-bis-nitriles are also effective polymerization catalysts. Mixtures of catalysts may be employed. The amount of catalyst can be varied over a wide range, but advantageously from about 0.01 to 2.0 percent or more based on the total weight monomers to be polymerized. The temperature at which the polymerizations are carried out can vary from about 30° C. to 100° C., but preferably from 50° to 90° C. Batch or continuous processes can be employed. Where a continuous process is used, the monomers and other substituents making up the reaction mixture can be added to the reaction system in continuous manner and the polymer withdrawn from the system as formed.

For the preparation of the hydrosols of our invention, the polymerizations must be carried out in aqueous dispersion, in the presence preferably of a water-soluble catalyst such as potassium persulfate, and advantageously in the presence also of a surface-active agent. The preferred practice is to first prepare an aqueous solution containing the catalyst and the surface-active agent, heat the solution to the desired temperature, and then add the monomers in admixture dropwise to the reaction mixture, or add separately dropwise and at such rate that the respective monomers are completely added at the end of any stated time period. After completion of the addition of all of the monomers, the reaction mixture is then heated for a period up to several hours or more on a steam bath. The resulting stable hydrosol is found to contain the resinous interpolymers, above-defined, in the form of small particles or beads measuring in diameter about from 72 to 150 millimicrons. If desired, an activating agent such as an alkali metal sulfite or bisulfite, e. g., sodium, potassium, etc., sulfites and metabisulfites can be added to the polymerization reaction mixture in about the same amount as the polymerization catalyst in which case lower polymerization temperatures may be used. Chain regulators such as hexyl, cetyl, dodecyl, myristyl, etc. mercaptans can also be employed in the polymerizations. Suitable surface-active agents include fatty acid soaps, fatty alcohol sulfates such as sodium lauryl sulfate, potassium lauryl sulfate, etc., alkali metal salts of aromatic sulfonic acids, e. g., sodium isobutyl-naphthalene sulfonate, etc., sulfosuccinic esters, γ-stearaminopropyl, dimethyl β-hydroxyethyl ammonium chloride, and the like.

The following examples will serve further to illustrate the manner whereby we practice our invention.

EXAMPLE 1

Into a four-necked two-liter round bottom flask equipped with dropping funnel, mechanical stirrer, thermometer for liquid temperature, and reflux condenser were placed 1.27 g. (0.5 percent) of potassium persulfate, 5 g. of Duponol-ME (sodium lauryl sulfate), 40 g. of methacrylamide and 1000 cc. of hot tap water. With steam heating and stirrer on, the following mixture was added dropwise: 150 g. of n-butyl acrylate, 32 g. of styrene and 32 g. of 4-vinylpyridine. At the end of the addition of the liquid monomers (about an hour) a hydrosol was formed. Then 0.32 g. more of potassium persulfate was added to the hot mixture, briefly stirred, and the sol permitted to stand on the steam bath for two additional hours without stirring, so as to insure complete polymerization. On cooling, after the two-hour heating period, the sol was filtered through cloth to remove a small amount of coagulum and a sample was coated upon a glass plate. After drying overnight at room temperature, a clear flexible film resulted, which was soaked for about 15 minutes in a dilute aqueous solution of the free acid dye, Erio Fast Cyanine S-acid. A film of a ternary hydrosol, similar but not containing 4-vinylpyridine, was similarly treated in the same bath at the same time. After one hour washing in running cold tap water, the sample containing the 4-vinylpyridine was still deep blue in color, whereas the sample made without the pyridine derivative was perfectly colorless. Thus the dye was retained due to the presence of and mordanting ability of the 4-vinylpyridine in the interpolymer.

In place of the 4-vinylpyridine in the above example, there can be substituted a like amount of 2-vinylpyridine to give a similar kind of resinous interpolymer. In place of the methacrylamide in the above example, there can be substituted a like amount of acrylamide or N-methyl methacrylamide to give similar kinds of quaternary interpolymers.

EXAMPLES 2–5

The following table shows a series of interpolymers containing various amounts of 4-vinylpyridine.

Table

| Example No. | Weight Percent | | | |
|---|---|---|---|---|
| | 4-Vinyl Pyridine | n-Butyl Acrylate | Styrene | Methacrylamide |
| 2 | 14 | 59 | 25 | 2 |
| 3 | 12 | 59 | 25 | 4 |
| 4 | 8 | 59 | 25 | 8 |
| 5 | 4 | 59 | 25 | 12 |

All of the above composition interpolymers are compatible with aqueous gelatin solutions and give clear films when coated 1:1 with gelatin. Such films are capable of absorbing acid dyes tenaciously. Compositions outside the above ranges of 4-vinylpyridine did not give compatible interpolymers having satisfactory mordanting properties.

EXAMPLE 6

In the same apparatus described in Example 1 were placed 800 cc. of hot tap water, 1.27 g. of potassium persulfate, 2.5 g. of sodium lauryl sulfate and 10 g. of methacrylamide. While stirring this mixture mechanically and heating it with steam, the following two mixtures were added dropwise through separate funnels so as to empty at approximately the same time: (A) 150 g. of n-butyl acrylate, 64 g. of styrene and 30 g. of 4-vinylpyridine plus, (b) 2.5 g. of sodium lauryl sulfate dissolved in 200 cc. of tap water. The resultant hydrosol was heated for two additional hours on the steam bath without stirring. A sample of the filtered, cooled hydrosol was diluted with water to produce 130 cc. of a 5.4 percent concentration of solids in the hydrosol. This was slowly added to 70 cc. of a stirred aqueous solution of 10 percent gelatin. An opaque sol resulted which was free of any gross precipitation. The pH of this mixture was then adjusted to pH=4.2 by addition of a dilute citric acid solution. A sol still free from gross precipitation resulted. To 100 cc. of this solution was then added 1 cc. of 40 percent formaldehyde solution. This mixture was coated upon a glass plate and dried overnight at room temperature; a clear film resulted. This film was soaked for a few minutes in a dilute solution of Erio Fast Cyanine S-acid dye and then allowed to stand 24 hours in running cold tap water; a clear, heavily blue-dyed film resulted on drying.

EXAMPLE 7

The polymerization procedure of above Example 6 was exactly repeated except that 2-vinylpyridine was substituted for the 4-vinylpyridine and ethyl acrylate was used in place of the n-butyl acrylate. The hydrosol so obtained was similar in properties to the one whose preparation was described in Example 6.

In place of the ethyl acrylate in the above example, there can be substituted a like amount of n-butyl acrylate to give a quaternary interpolymer having similar properties.

By proceeding as described in the above examples, other quaternary interpolymers of the invention coming within the specified proportions can be prepared with others of the mentioned suitable components. These other interpolymers have similar properties and their hydrosols are also compatible with aqueous gelatin solutions and in such admixtures give clear, flexible films capable of retaining acid dyes.

What we claim is:

1. A resinous quaternary interpolymer comprising from 3.5 to 16 percent by weight of a compound selected from those represented by the following general formulas:

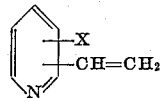

and

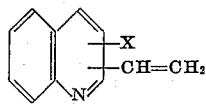

wherein X represents a member selected from the group consisting of an atom of hydrogen, an alkyl group containing from 1 to 4 carbon atoms and a halogen atom, from 50 to 60 percent by weight of a compound selected from those represented by the following general formula:

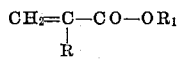

wherein R represents a member selected from the group consisting of an atom of hydrogen, a halogen atom and an alkyl group containing from 1 to 4 carbon atoms and $R_1$ represents a member selected from the group consisting of an alkyl group containing from 1 to 12 carbon atoms, a cyanoalkyl group containing from 1 to 4 carbon atoms and a halogen substituted alkyl group containing from 1 to 4 carbon atoms, from 3.5 to 16 percent by weight of a compound selected from those represented by the following general formula:

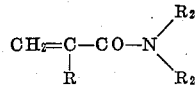

wherein R has the above definition and $R_2$ represents a member selected from the group consisting of an atom of hydrogen and an alkyl group containing from 1 to 4 carbon atoms, and from 12 to 26 parts by weight of a compound selected from those represented by the following general formula:

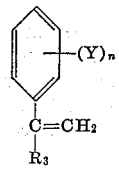

wherein $n$ represents a whole number from 1 to 5, Y represents a member selected from the group consisting of an atom of hydrogen, an alkyl group containing from 1 to 4 carbon atoms, a cyano group, a nitro group, a halogen atom and a dialkylamino group containing from 1 to 4 carbon atoms, and $R_3$ represents a member selected from the group consisting of an atom of hydrogen and an alkyl group containing from 1 to 4 carbon atoms.

2. A resinous quaternary interpolymer comprising from 3.5 to 16 percent by weight of 4-vinylpyridine, from 50 to 60 percent by weight of n-butyl acrylate, from 3.5 to 16 percent by weight of methacrylamide and from 12 to 26 percent by weight of styrene.

3. A resinous quaternary interpolymer comprising from 3.5 to 16 percent by weight of 2-vinylpyridine, from 50 to 60 percent by weight of ethyl acrylate, from 3.5 to 16 percent by weight of methacrylamide and from 12 to 26 percent by weight of styrene.

4. A resinous quaternary interpolymer comprising from 3.5 to 16 percent by weight of 2-vinylpyridine, from 50 to 60 percent by weight of n-butyl acrylate, from 3.5 to 16 percent by weight of methacrylamide and from 12 to 26 percent by weight of styrene.

5. A resinous quaternary interpolymer comprising from 3.5 to 16 percent by weight of 4-vinylpyridine, from 50 to 60 percent by weight of n-butyl acrylate, from 3.5 to 16 percent by weight of acrylamide and from 12 to 26 percent by weight of styrene.

6. A resinous quaternary interpolymer comprising from 3.5 to 16 percent by weight of 4-vinylpyridine, from 50 to 60 percent by weight of n-butyl acrylate, from 3.5 to 16 percent by weight of N-methyl methacrylamide and from 12 to 26 percent by weight of styrene.

7. A gelatin compatible hydrosol of a resinous quaternary interpolymer comprising from 3.5 to 16 parts by weight of a compound selected from those represented by the following general formula:

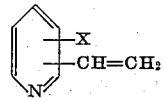

and

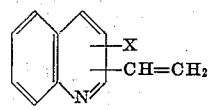

wherein X represents a member selected from the group consisting of an atom of hydrogen, an alkyl group containing from 1 to 4 carbon atoms and a halogen atom, from 50 to 60 parts by weight of a compound selected from those represented by the following general formula:

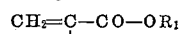

wherein R represents a member selected from the group consisting of an atom of hydrogen, a halogen atom and an alkyl group containing from 1 to 4 carbon atoms and $R_1$ represents a member selected from the group consisting of an alkyl group containing from 1 to 12 carbon atoms, a cyanoalkyl group containing from 1 to 4 carbon atoms and a halogen substituted alkyl group containing from 1 to 4 carbon atoms, from 3.5 to 16 parts by weight of a compound selected from those represented by the following general formula:

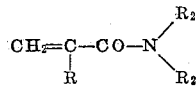

wherein R has the above definition and $R_2$ represents a member selected from the group consisting of an atom of hydrogen and an alkyl group containing from 1 to 4 carbon atoms, and from 12 to 26 parts by weight of a compound selected from those represented by the following general formula:

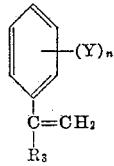

wherein $n$ represents a whole number from 1 to 5, Y represents a member selected from the group consisting of an atom of hydrogen, an alkyl group containing from 1 to 4 carbon atoms, a cyano group, a nitro group, a halogen atom, and a dialkylamino group containing from 1 to 4 carbon atoms, and $R_3$ represents a member selected from the group consisting of an atom of hydrogen and an alkyl group containing from 1 to 4 carbon atoms.

8. A gelatin compatible hydrosol of a resinous quaternary interpolymer comprising from 3.5 to 16 parts by weight of 4-vinylpyridine, from 50 to 60 parts by weight of n-butyl acrylate, from 3.5 to 16 parts by weight of methacrylamide and from 12 to 26 parts by weight of styrene.

9. A gelatin compatible hydrosol of a resinous quaternary interpolymer comprising from 3.5 to 16 parts by weight of 2-vinylpyridine, from 50 to 60 parts by weight of ethyl acrylate, from 3.5 to 16 parts by weight of methacrylamide and from 12 to 26 parts by weight of styrene.

10. A gelatin compatible hydrosol of a resinous quaternary interpolymer comprising from 3.5 to 16 parts by weight of 2-vinylpyridine, from 50 to 60 parts by weight of n-butyl acrylate, from 3.5 to 16 parts by weight of methacrylamide and from 12 to 26 parts by weight of styrene.

11. A gelatin compatible hydrosol of a resinous quaternary interpolymer comprising from 3.5 to 16 parts by weight of 4-vinylpyridine, from 50 to 60 parts by weight of n-butyl acrylate, from 3.5 to 16 parts by weight of acrylamide and from 12 to 26 parts by weight of styrene.

12. A gelatin compatible hydrosol of a resinous quaternary interpolymer comprising from 3.5 to 16 parts by weight of 4-vinylpyridine, from 50 to 60 parts by weight of n-butyl acrylate, from 3.5 to 16 parts by weight of N-methyl methacrylamide and from 12 to 26 parts by weight of styrene.

13. A process for preparing a gelatin compatible hydrosol of a resinous quaternary interpolymer which comprises dispersing from 3.5 to 16 parts by weight of a compound selected from those represented by the following general formula:

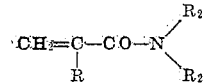

wherein R represents a member selected from the group consisting of an atom of hydrogen, a halogen atom and an alkyl group containing from 1 to 4 carbon atoms and $R_2$ represents a member selected from the group consisting of an atom of hydrogen and an alkyl group containing from 1 to 4 carbon atoms, in water containing a percompound polymerization catalyst and a surface-active agent, heating the mixture to a temperature of from 30° to 100° C., and while maintaining the said mixture at said temperature, slowly introducing therein a mixture of from 3.5 to 16 parts by weight of a compound selected from those represented by the following general formulas:

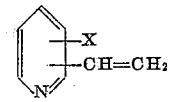

and

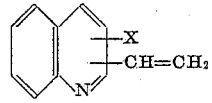

wherein X represents a member selected from the group consisting of an atom of hydrogen, an alkyl group containing from 1 to 4 carbon atoms, and a halogen atom, from 50 to 60 parts by weight of a compound selected from those represented by the following general formula:

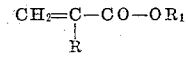

wherein R has the above definition and $R_1$ represents a member selected from the group consisting of an alkyl group containing from 1 to 12 carbon atoms, a cyanoalkyl group containing from 1 to 4 carbon atoms and a halogen substituted alkyl group containing from 1 to 4 carbon atoms, and from 12 to 26 parts by weight of a compound selected from those represented by the following general formula:

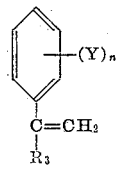

wherein $n$ represents a whole number from 1 to 5, Y represents a member selected from the group consisting of an atom of hydrogen, an alkyl group containing from 1 to 4 carbon atoms, a cyano group, a nitro group, a halogen atom and a dialkylamino group containing from 1 to 4 carbon atoms, and $R_3$ represents a member selected from the group consisting of an atom of hydrogen and an alkyl group containing from 1 to 4 carbon atoms, and then continuing to heat the reaction mixture at said temperature until the said monomeric compounds have interpolymerized and formed the said hydrosol.

14. A process for preparing a gelatin compatible hydrosol of a resinous quaternary interpolymer which comprises dispersing from 3.5 to 16 parts by weight of methacrylamide in water containing potassium persulfate and a surface-active agent, heating the mixture to a temperature of from 50° to 90° C., and while maintaining said mixture at said temperature, slowly introducing therein a mixture of from 3.5 to 16 parts by weight of 4-vinylpyridine, from 50 to 60 parts by weight of n-butyl acrylate and from 12 to 26 parts by weight of styrene, and then continuing to heat the reaction mixture at said temperature until the said monomeric compounds have interpolymerized and formed the said hydrosol.

15. A process for preparing a gelatin compatible hydrosol of a resinous quaternary interpolymer which comprises dispersing from 3.5 to 16 parts by weight of methacrylamide in water containing potassium persulfate and a surface-active agent, heating the mixture to a temperature of from 50° to 90° C., and while maintaining said mixture at said temperature, slowly introducing therein a mixture of from 3.5 to 16 parts by weight of 2-vinylpyridine, from 50 to 60 parts by weight of ethyl acrylate and from 12 to 26 parts by weight of styrene, and then continuing to heat the reaction mixture at said temperature until the said monomeric compounds have interpolymerized and formed the said hydrosol.

16. A process for preparing a gelatin compatible hydrosol of a resinous quaternary interpolymer which comprises dispersing from 3.5 to 16 parts by weight of methacrylamide in water containing potassium persulfate and a surface active agent, heating the mixture to a temperature of from 50° to 90° C., and while maintaining said mixture at said temperature, slowly introducing therein a mixture of from 3.5 to 16 parts by weight of 2-vinylpyridine, from 50 to 60 parts by weight of n-butyl acrylate and from 12 to 26 parts by weight of styrene, and then continuing to heat the reaction mixture at said temperature until the said monomeric compounds have interpolymerized and formed the said hydrosol.

17. A process for preparing a gelatin compatible hydrosol of a resinous quaternary interpolymer which comprises dispersing from 3.5 to 16 parts by weight of acrylamide in water containing potassium persulfate and a surface active agent, heating the mixture to a temperature of from 50° to 90° C., and while maintaining said mixture at said temperature, slowly introducing therein a mixture of from 3.5 to 16 parts by weight of 4-vinylpyridine, from 50 to 60 parts by weight of n-butyl acrylate and from 12 to 26 parts by weight of styrene, and then continuing to heat the reaction mixture at said temperature until the said monomeric compounds have interpolymerized and formed the said hydrosol.

18. A process for preparing a gelatin compatible hydrosol of a resinous quaternary interpolymer which comprises dispersing from 3.5 to 16 parts by weight of N-methyl methacrylamide in water containing potassium persulfate and a surface-active agent, heating the mixture to a temperature of from 50° to 90° C., and while maintaining said mixture at said temperature, slowly introducing therein a mixture of from 3.5 to 16 parts by weight of 4-vinylpyridine, from 50 to 60 parts by weight of n-butyl acrylate and from 12 to 26 parts by weight of styrene, and then continuing to heat the reaction mixture at said temperature until the said monomeric compounds have interpolymerized and formed the said hydrosol.

No references cited.